United States Patent
Huang

(10) Patent No.: US 6,928,951 B2
(45) Date of Patent: Aug. 16, 2005

(54) FOLDABLE TRIANGULAR CAUTION DEVICE

(76) Inventor: Sunny En Liung Huang, 786 Via Monte Video St., Claremont, CA (US) 91711

( * ) Notice: Subject to any disclaimer, the term of this patent is extended or adjusted under 35 U.S.C. 154(b) by 0 days.

(21) Appl. No.: 10/449,681

(22) Filed: Jun. 2, 2003

(65) Prior Publication Data

US 2004/0237876 A1 Dec. 2, 2004

(51) Int. Cl.⁷ .................................................. E01F 9/12
(52) U.S. Cl. .................. 116/63 P; 116/63 T; 116/28 R; 40/903; 403/289.11
(58) Field of Search ................................ 116/28 R, 42, 116/45, 63 P, 63 C, 63 T, 63 R; 40/903, 610, 612, 643, 644, 591, 593, 603, 604; 160/370.21, 377, 351, 354; 296/97.7, 97.8; 403/126, 289.11, 291.1, 215

(56) References Cited

U.S. PATENT DOCUMENTS

| | | | | | |
|---|---|---|---|---|---|
| 2,235,282 A | * | 3/1941 | Carver | | 248/472 |
| 2,911,038 A | * | 11/1959 | Frommelt | | 160/351 |
| RE29,566 E | * | 3/1978 | Brudy | | 359/553 |
| 4,426,801 A | * | 1/1984 | Gates | | 40/610 |
| 4,462,145 A | * | 7/1984 | Schulze | | 29/428 |
| 4,607,444 A | * | 8/1986 | Foster | | 40/550 |
| 5,116,273 A | * | 5/1992 | Chan | | 160/370.21 |
| 5,355,605 A | * | 10/1994 | Kim | | 40/603 |
| 5,398,437 A | * | 3/1995 | Bump, Jr. et al. | | 40/582 |
| 5,452,934 A | * | 9/1995 | Zheng | | 296/97.7 |
| 5,606,309 A | * | 2/1997 | Smith | | 340/473 |
| 5,685,255 A | * | 11/1997 | Arzu | | 116/30 |
| 5,771,954 A | * | 6/1998 | Benner et al. | | 160/231.2 |
| 5,782,447 A | * | 7/1998 | Hoffend | | 248/227.1 |
| 5,950,969 A | * | 9/1999 | Bennett et al. | | 248/127 |
| 5,970,639 A | * | 10/1999 | Hui | | 40/610 |
| 5,992,045 A | * | 11/1999 | Kellogg et al. | | 34/442 |
| 6,178,676 B1 | * | 1/2001 | Lund | | 40/591 |
| 6,179,038 B1 | * | 1/2001 | Eskandry | | 160/370.21 |
| 6,199,504 B1 | * | 3/2001 | Freeman | | 116/63 C |
| 6,266,904 B1 | * | 7/2001 | Zheng | | 40/604 |
| 6,357,510 B1 | * | 3/2002 | Zheng | | 160/354 |
| 6,389,721 B1 | * | 5/2002 | Yang | | 40/610 |
| 6,491,052 B1 | * | 12/2002 | Zheng | | 135/125 |
| 6,499,498 B1 | * | 12/2002 | Zheng | | 135/125 |
| 6,516,571 B1 | * | 2/2003 | Overthun et al. | | 52/36.1 |

* cited by examiner

Primary Examiner—R. Alexander Smith
(74) Attorney, Agent, or Firm—Paul M. Denk

(57) ABSTRACT

A flexible foldable triangular warning device is provided. The warning device is made from at least one panel and can be moved between a compact or storage position and an expanded position in which the warning device can be made to be free standing. The device can comprise a single panel, in which case, the device includes a base which will enable the panel to be free standing or to be mounted to the window of a vehicle. The device can also comprise two, three, four, or more panels, in which case, the device will set up to form a triangular or rectangular pyramid.

9 Claims, 8 Drawing Sheets

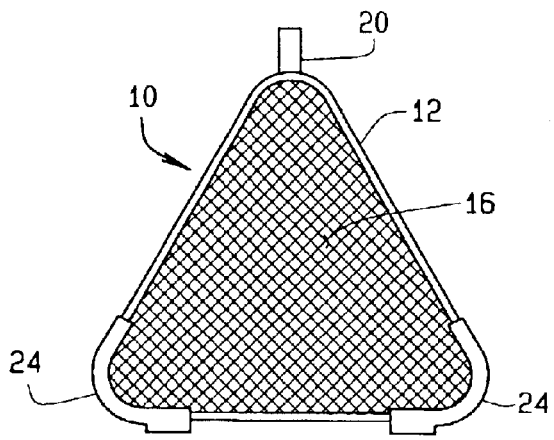
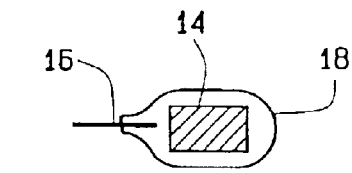
FIG. 1A
FIG. 1
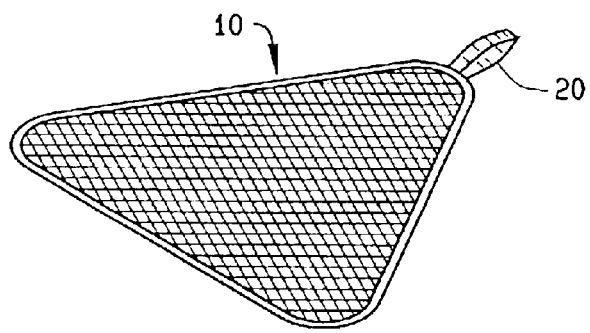
FIG. 3
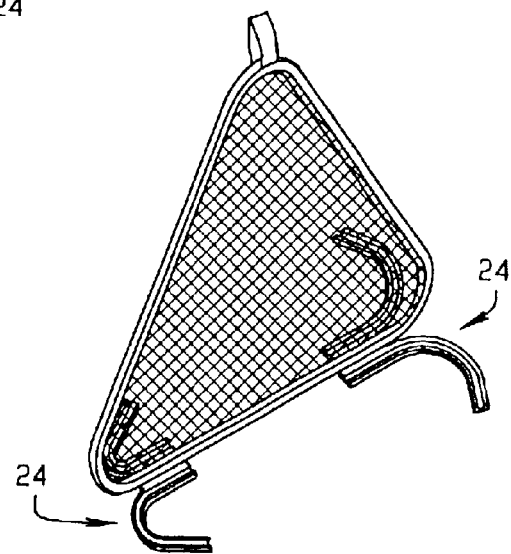
FIG. 2
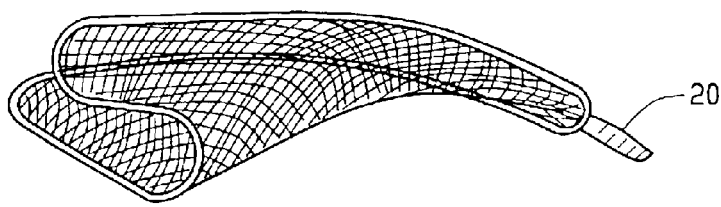
FIG. 4
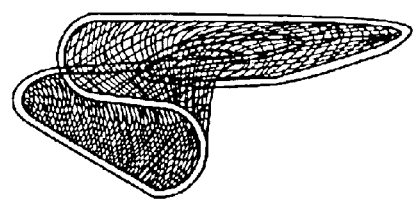
FIG. 5
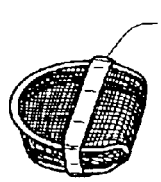
FIG. 6

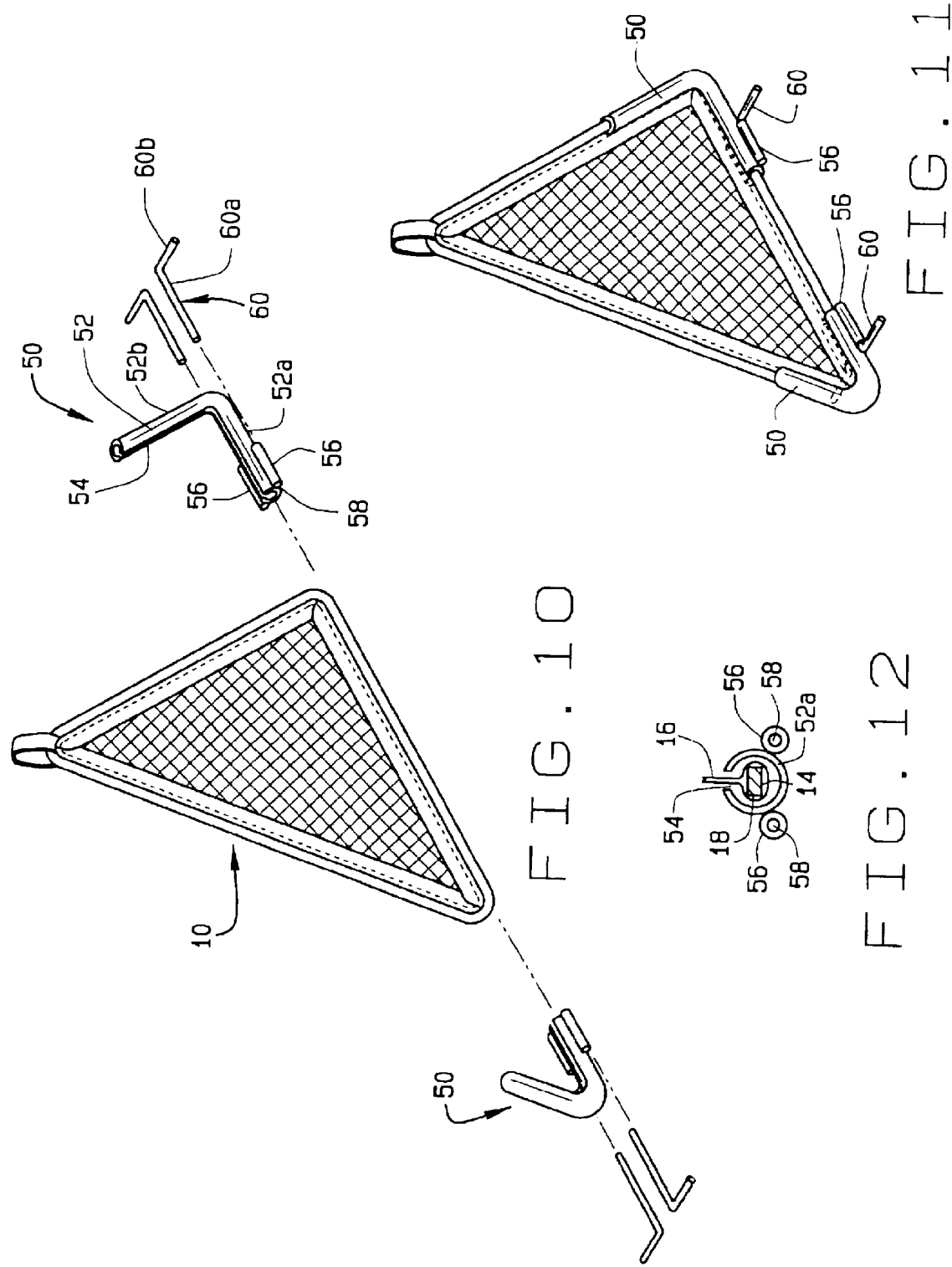

FOLDABLE TRIANGULAR CAUTION DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This application relates generally to cautionary devices, such as traffic caution signs, and, in particular, to foldable triangular cautionary signs or signal.

Drivers often have to stop by the side of the road, for example, to change a tire. When the driver gets out of the car, he subjects himself to the danger of being hit by passing cars. Typically, a driver will activate his warning lights which causes the back lights to blink on and off to inform other drivers that he has stopped. However, depending on lighting conditions, it is sometimes difficult for other drivers to see the warning lights.

Emergency traffic workers, such as tow-truck drivers, policemen, etc. often have small cones which they can place behind a car to warn on-coming traffic of the need to be careful. However, the use of such devices is not convenient for a typical driver. Additionally, there generally is no place to convenient place to store such cones.

BRIEF SUMMARY OF THE INVENTION

Briefly stated, a collapsible warning device is provided. The warning device is made from at lest one panel, and the panel is made from a web having a channel at the periphery of the web and a flexible wire frame which extends through the web. Because the panel is flexible, the panel is movable between an expanded state, in which the panel lies generally on a single plane, and a stored position. The panel can be made more visible, for example, by provided it with a light emitting device, such as a plurality of LED's, or with a strip of reflective material which extends, for example, about the periphery of the panel. Additionally, the panel can be provided with shapes, such as exclamation points or other shapes. Further, the web of the panel need not fill the entire area defined by the frame. For example, the web can be "+" shaped or "Y" shaped, or be in any other desired shape.

The warning device is can be used simply as the panel, or preferably, can be made to be self standing. In one embodiment, a base is provided which enables the warning device to be self standing. In a first variation, the base comprises a connector and a leg which are pivotally connected together to form a connector-leg assembly. The connector has a groove which is sized and shaped to receive at least a part of a peripheral edge of the panel. Preferably, two connector-leg assemblies are used, and more preferably, the connector-leg assemblies are positioned such that the legs are on opposite sides of the panel. The legs are pivotal between a first position in which they are adjacent and generally parallel to the plane of the panel and a second position in which they are generally perpendicular to the plane of the panel. Preferably, the legs define a channel which is sized and shaped to at least partially enclose the panel periphery when the legs are in their first position. At least one of the legs can be provided with a hook portion, to enable the base to be mounted to a window, such as the window of a vehicle.

An alternative base comprises a channel member having a first portion which receives at least a part of a bottom edge of the panel and a second portion which receives at least a part of a side edge of the panel. The channel member includes a slit, slot, or other opening to allow the channel member to receive the peripheral edge of the panel. A leg pivotally mounted to the channel member and is movable between a first position in which the leg is generally perpendicular to the plane of the panel and a second position in which the leg is generally parallel to the plane of the panel. Preferably, there are two legs, one leg on either side of the channel. Additionally, the channel member includes a sleeve which receives the leg.

In another variation of the warning device, the warning device includes two or more panels, and the panels themselves form the base to make the warning device self standing or free standing. In one variation, the warning device comprises two panels which are operatively connected together along a top edge thereof and are moveable between a first position in which the panels are substantially parallel to each other and a second position in which the panels are adjacent each other at their top edges and spaced apart from each other at their bottom edges. A strap extends between the bottom edges of the two panels to maintain the panels in the second position. The two panels can include independent frames, in which case, the two separate and independent panels are hingedly connected together by a clip or connector. Alternatively, the two panels can be formed on a common framework, which defines generally a figure eight or has a generally hour glass shape.

The warning device can also be made of three panels, which are pivotally connected together along side edges, such that the three panels define a central panel and two outer panels. The warning device, when set up, will form a triangular pyramid. This warning device can be provided with a fourth panel, such that the triangular pyramid includes a base or bottom panel. Thus, the warning device forms a quadrahedron when in its free-standing position.

The warning device can also comprise four panels which are hingedly connected together to form a square pyramid.

BRIEF DESCRIPTION OF THE SEVERAL VIEWS OF THE DRAWINGS

FIG. 1 is a plan view of a triangular warning device of the present invention including a corner base for mounting the device on a car;

FIG. 1A is a fragmentary cross-sectional view of a panel of the warning device;

FIG. 2 is a perspective view of the triangular warning device with the corner bases shown opened to enable the warning device to be free standing;

FIG. 3 is a perspective view of a panel of the warning device;

FIGS. 4–6 show the warning device being folded to its storable position;

FIG. 10 is an exploded view of an alternative base which enables the warning device to be a free-standing warning device;

FIG. 11 is a view of the warning device mounted base of FIG. 10;

FIG. 12 is an end view of the base of FIG. 10 with a panel positioned therein;

Corresponding reference numerals will be used throughout the several figures of the drawings.

DETAILED DESCRIPTION OF THE INVENTION

Figure 7:
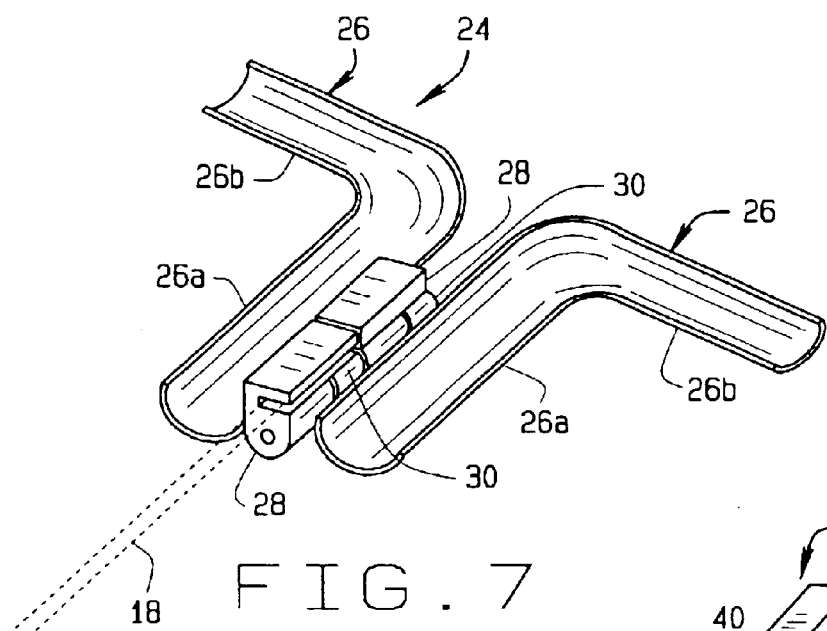
FIG. 7 is an enlarged perspective view of the base, in an opened position.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A warning device 10 of the present invention comprises a panel 12 which is preferably generally triangular in shape. The panel 12 has a flexible wire frame 14 and a web 16 which is stretched between the edges of the frame. The web is preferable made from a material which is easily visible. For example, the web can be orange or yellow in color, colors which is often associated with warning signs. Although the web 16 is shown to be a net-like material, it will be appreciated that the web can also be more solid (i.e., the threads of the web can be closer together.) Because the device is foldable, the material from which the web 16 is made is flexible, and hence is preferably a cloth or flexible plastic sheet. A channel 18 is formed at the periphery of the web 16, and the frame 14 passes through this channel. The channel can be formed by folding over the edge of the web material, and then sewing down the folded over edge, or by sewing a separate piece of material onto the edge of the web. The panel 10 includes an elastic band 20, shown to be positioned at one of the corners of the triangle.

The panel 10 is flexible and foldable, and hence, is movable from a folded position as shown in FIG. 6 and an expanded position, as shown in FIG. 3. FIGS. 3–6, show folding or compressing of the panel from the expanded to the folded position. When in the folded position, the strap 20 can pass around the folded panel 10 to hold the panel in its folded position. The panel, when in this position, is compact and can be stored in a small space, such as a trunk, glove compartment, or seat pocket in an automobile.

Preferably, the panel is provided with some mechanism to hold it upright, so that the panel can stand on the roadside next to the car, or be mounted to the car. In one embodiment, a panel base comprises a corner base assemblies 24 which are mounted to the panel to cover the corners of the panel. As seen in FIGS. 1 and 2, the base assemblies 24 are movable between a storage position in which the base members are generally parallel to the plane of the panel and a use position in which the base members are generally perpendicular to the plane of the panel.

Figure 8:
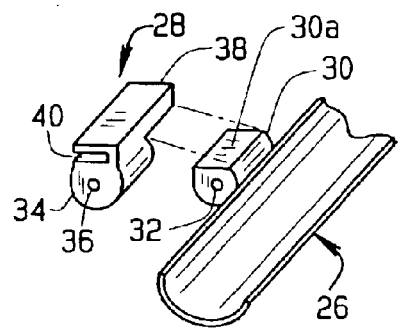
FIG. 8 is an exploded perspective view of one-half or one side of the base.

The base assembly 24 is shown in greater detail in FIGS. 7 and 8. The base assembly 24 includes a pair of legs 26 and pair of connectors 28. The legs 26 each include a bottom portion 26a and a side portion 26b which are joined at an elbow with an angle substantially equal to the angle of the corner of the panel frame 14. Thus, for example, the panel 10 is shown in FIG. 1 to be an equilateral triangle. Hence, the leg portions 26a and 26b would meet at an angle of about 60°. The corner of the panel is curved, to avoid sharp corners on the panel. Thus, the corner, or elbow, of the base leg 26 is also curved, the curvature of the leg elbow being complementary to the curvature of the panel corner. The legs 26 define a channel which is sized to fit around or receive the periphery of the panel 10 (i.e., the frame 14 and channel 18). The legs 26 also include a sleeve 30 on its bottom portion 26b. The sleeve 30 is generally cylindrical in shape, but has a flat top surface 30a. A passage 32 extends axially through the sleeve 30.

The connector 28 includes a connector base 34 which is shaped complimentarily to the arm sleeve 30. A passage 36 extends axially through the base to be aligned with the leg sleeve passage 32. An elongate head 38 is formed on top of the body, and extends beyond the end of the body. A slot 40 is formed between the connector head 38 and the connector body 36. The head 38 has a front surface that is flush with the front surface of the body, but extends beyond the back surface of the body a distance sufficient, such that the back surface of the head is substantially flush with the back surface of the leg sleeve when the connector is assembled to the leg, as seen in FIG. 7. The head 38 is sized and dimensioned such that there is a gap between the bottom surface of the head 38 and the flat surface 30a of the leg sleeve 30 when the base 24 is opened as seen in FIG. 7. This gap is, in effect, an extension of the slot 40. The slot 40 and the gap between the head and the leg sleeve are the same size, and are sized to slidingly receive the panel periphery 18 (whish is shown in phantom in FIGS. 7 and 8 and is visible in FIG. 9).

The connector 28 and leg 26 are joined together by a pin which extends though the holes 36 and 32, respectively of the connector and leg sleeve to form a connector-leg assembly. As seen in FIG. 7, the base assembly 24 is formed from two connector-leg assemblies which are connected together by the pin which extends through the passages of the respective legs and connectors of the two assemblies. The two connector-leg assemblies are mounted to opposite sides of the panel, and, hence, the slots from the two connector-leg assemblies face in opposite directions. As noted above, the panel peripheral edge is slidingly received in the slots of the two connector-leg assemblies. Because the slots face each other, and because the pin passes through both of the connector-leg assemblies, the base assembly will not move perpendicularly relative to the panel. The pin allows for the legs 26 to pivot relative to the connectors 28. Hence, the two legs are independently pivotable between the position shown in FIG. 1, in which the legs are generally parallel to the plane of the panel and in which the channels of the legs surround the panel frame, and a position as shown in FIG. 2, in which the legs are generally perpendicular to the panel. In the second position, the flat surface 30a of the leg sleeve 30 will be pivoted away from the panel periphery. Because the frame is only physically received by the connector slot 40, and is not fixed to the leg 26, the panel frame 14 will not be twisted or interfere with movement of the legs 26 between the open position (FIG. 7) and the closed position (FIG. 2). Thus, the connector 28 holds the connector-leg assembly to the panel, and the legs 26 are free to rotate about the pin relative to the panel.

Figure 9:
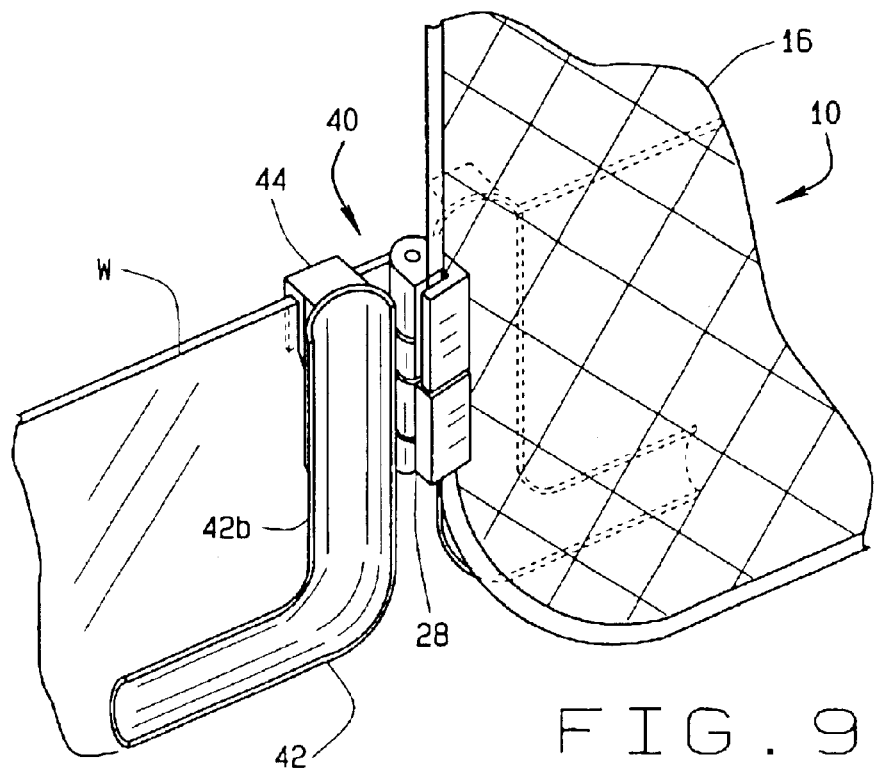
FIG. 9 is a perspective view of the warning device mounted on a car window using a window-mounting base.

In FIG. 9, the base assembly has been modified to mount the panel 10 on a window W of a vehicle, such as a car. The base assembly 40 is substantially similar to the base assembly 24. It includes the connector 28 which mounts the base assembly to the panel and a leg 42. The connector 28 is the same connector used in the base assembly 24. The leg 42 is substantially similar to the leg 26 of the base assembly 24. The only difference is that the leg 42 is provided with a hook portion 44 at the top of the leg portion 42b. The leg hook portion 44 is sized and shaped to fit over the top edge of the window W. To provide a more secure mounting of the panel to the window W, both legs 42 of the base are provided with hooks. The base 40 is mounted to the panel 10 in the same way as the base 24. Hence, the panel 10 can pivot relative to the two legs 44. Therefore, when the panel is mounted to a car window, the panel can be pivoted to extend generally perpendicularly from the car window to enhance visibility of the warning device.

FIGS. 10–12 shows an alternative base used to enable the panel 10 to stand upright on the ground. The base 50 includes a tubular member 52 having a slot 54 which extends along the length of the tubular member 52. The member 52 includes a bottom portion 52a and a side portion 52b which are joined at an elbow. The slot 54 extends along the upper surface of the bottom portion 52a and along the inner surface of the side portion 52b. The side and bottom portions 52a and 52b define an angle substantially equal to the angle defined by the bottom and side edges of the panel 10. As with the bases 24, the corner of the base 50 is preferably rounded. The panel shown in FIG. 10 is an equilateral triangle. Hence, with the elbow forms and angle of about 60°. The tubular member itself is sized to receive the periphery of the panel 10, and the slot 54 is sized to allow the panel web 16 to pass from within the member 52. A pair of sleeves 56 are mounted to opposite sides of the member bottom portion 52a. The sleeves 56 are positioned such that the bottom of the sleeve 56 is generally flush with the bottom of the member 52a. A passage 58 extends through each of the sleeves 56, and a generally L-shaped pin 60 is received in the sleeve passage. The pin 60 includes a leg 60a which is received in the passage 58 and a leg 60b which extends from the shaft 60a at a right angle. The pin 60 is rotatable in the passage 58. To support the panel 10 in an upright position, the panel is preferably provided with a pair of base members 50, there being one base member provided at each of the lower corners of the panel 10. The base member is applied to the panel by simply sliding the tubular member over the peripheral edge of the panel. To stand the panel up, the panel with the base members 50 is placed on the ground, and the pin is pivoted, if necessary, such that the pin legs 60b extend away from the panel and engage the ground. Because two pins are used with each base member, the pins will oppose each other, and the panel will not be able to pivot relative to the pins. Hence, the panel will stand erect. Although the pin legs 60b are shown to form right angles with the pin legs 60a, a right angle is not necessary. All that is necessary is that the end of the pin legs 60b be spaced from the panel 10 when they engage the ground, and that the legs 60b be sufficiently long to provide stability to the panel. Although two base members 50 are shown to maintain the panel in a standing position, a single base member 50 can support the panel in the standing position. Hence, two base members are not necessary.

Figure 13:
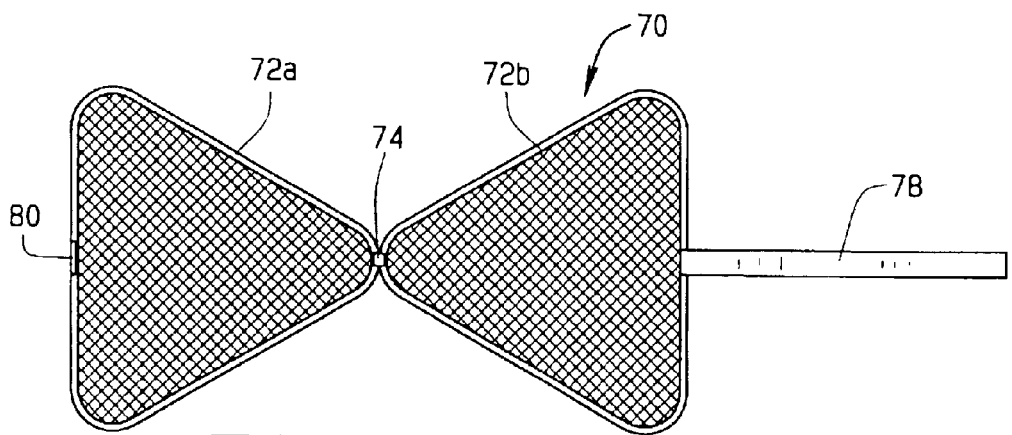
FIG. 13 is a plan view of a two-panel warning device which can form a free standing warning device.
Figure 14:
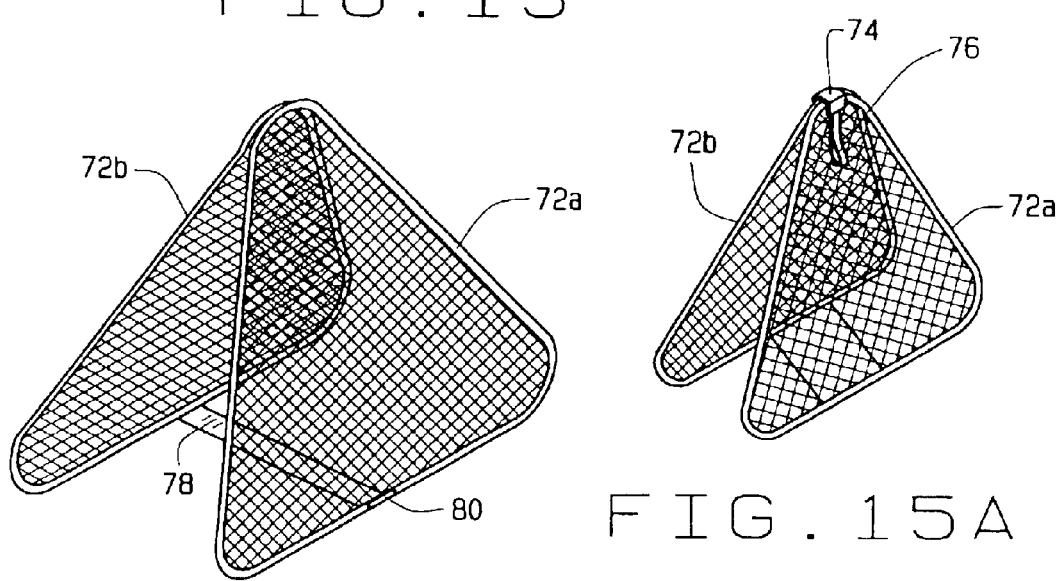
FIG. 14 is a perspective view of the warning device of FIG. 13 in its assembled, free-standing position.
Figure 15A:
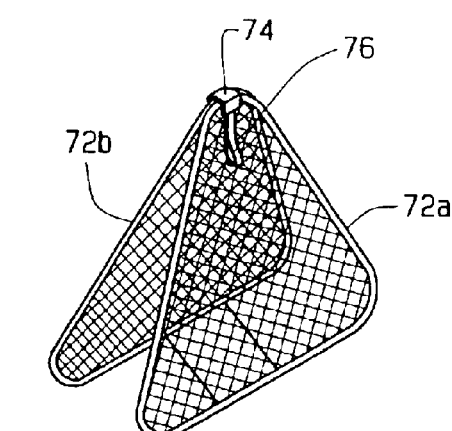
FIGS. 15A–C show the folding of the two-panel warning device of FIG. 14 into a compact position in which it can be easily stored.
Figure 15B:
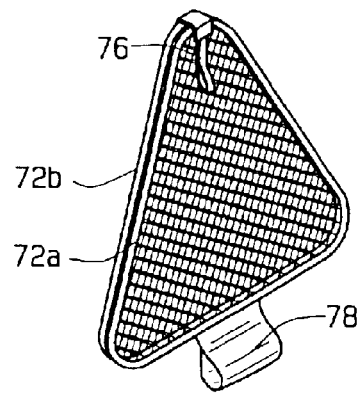
Figure 15C:
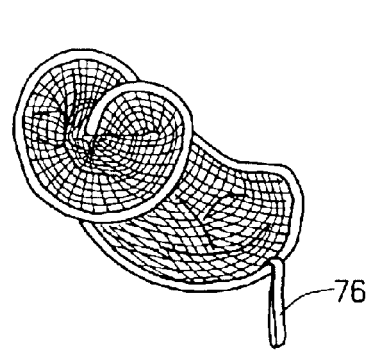

A two panel warning device 70 is shown in FIGS. 13–15C. The warning device 70 includes two panels 72a, b, which in construction, are substantially similar to the panel 10. The two panels are pivotally connected together along at least a portion of their top edges by a clip or clamp 74. As seen in FIGS. 13–15C, the panels 72a, b are triangularly shaped. Hence, the clamp 74 connects the two panels at their top corners. The clamp 74 defines a tube sized to receive the peripheral edge of both the panels at once. A slot is formed in the bottom of the clamp tube to allow the panel webs to pass through the clamp tube. Hence, the clamp loosely holds the two panels together, and they can pivot relative to each other. Hence, they can be brought together, so that the two panels are parallel, as seen in FIG. 15B. In this position, the panels can be folded into a compact state, similar to that shown in FIG. 6. FIG. 15C shows the warning device 70 being folded toward the compact storage position. When compacted, an elastic loop 76 can be extended around the folded panels to hold them in their compact position. When unfolded, the panels can be spaced apart, as shown in FIGS. 14 and 15A. A strap 78 extends between the bottom edges of the panels to prevent the panels from spreading apart too far. The strap 78 is fixed to the bottom edge of at least one of the panels, as seen in FIG. 13. In this case, the opposite panel is provided with a connector 80 which interacts with the strap 78 to removably hold the strap to the second panel. This connector can be a buckle, hook-and-loop strip, snap, or any other conventional type of connector. Alternatively, the strap 80 can be fixed to the bottom edges of both panels, as seen in FIGS. 15A–C.

Figure 16A:
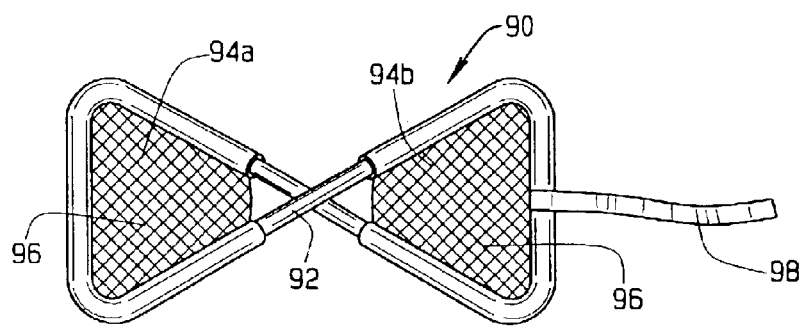
FIG. 16A is a plan view of an alternative two-panel warning device having a single frame.
Figure 16B:
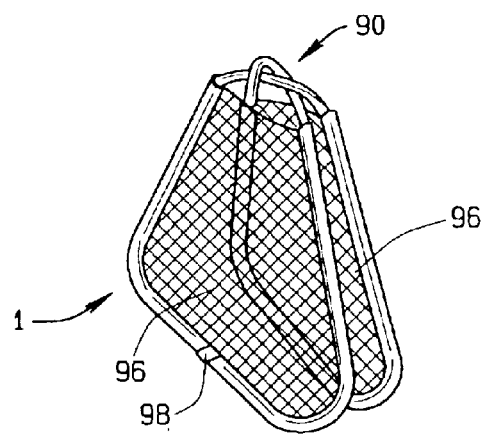
FIG. 16B is a perspective view of the warning device of FIG. 16A placed in a position for use.

A second embodiment of the two-panel waning device is shown in FIGS. 16A and B. The two-panel warning device 90 includes a single continuous frame member 92, which, as seen in FIG. 16A forms a figure eight or an hour-glass shape, to form two triangular areas 94a,b. A web 96 is secured in each of the triangular areas 94a,b in the same manner that the web 16 is applied to the frame 14 (FIG. 1), to, in effect, form two panels. However, the webs 96 do not extend to the apex of the triangular areas. Rather, there is a small area near the apex of each triangular area which is web-free. Lastly, a strap 98 is fixed to the bottom of one of the triangular areas, and is removably securable to the bottom of the other triangular area. To stand the warning device 90, the bottom edges of the two triangular areas are simply brought toward each other, and the free end of the strap is secured to the bottom edge of the opposite panel. For example, the strap can be secured using snaps, buttons, hook-and-pile fasteners, or other conventional fastening means. The device 90 can be pivoted between a position, shown in FIG. 16A in which the tow triangular areas are co-planer and a standing position, in which the bottom edges of the two triangular areas are brought together to allow the strap 98 to be connected between the two bottom edges. In this second position, the device 90 is a free standing warning device. The device 90 can be stored either flat, as seen in FIG. 16A or the two triangular sections can be brought together to be substantially parallel to each other so that the device can be folded into a compact state.

Figure 17B:
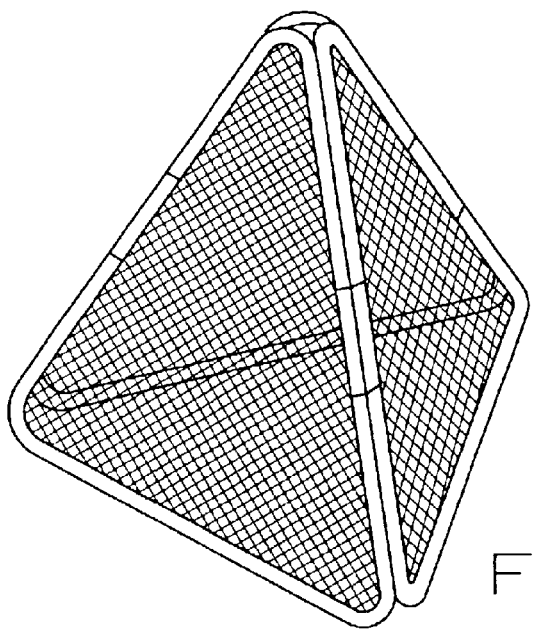
FIG. 17B is a perspective view of the three-panel warning device placed in a position for use.
Figure 17A:
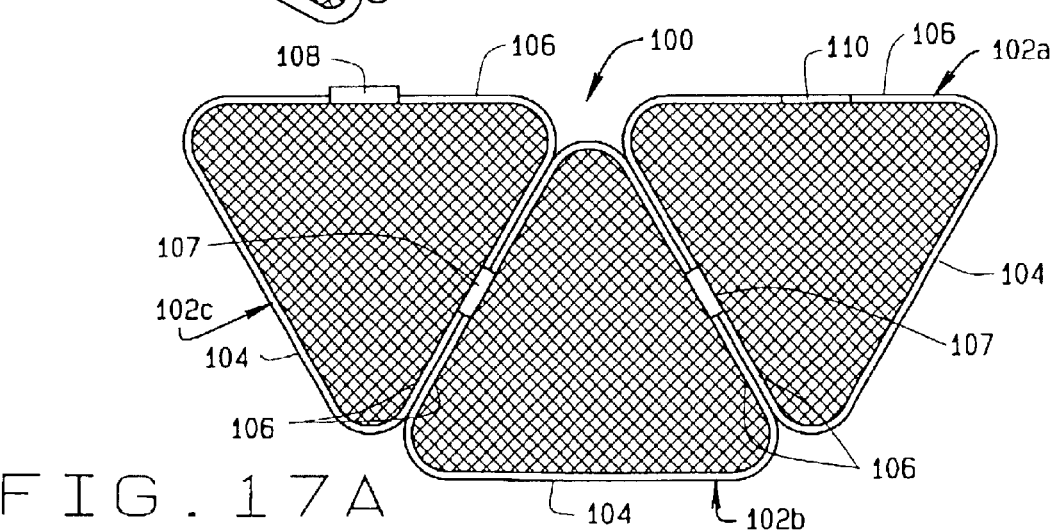
FIG. 17A is a plan view of a three-panel warning device which forms a triangular pyramid when set up.

A three-panel warning device 100 is shown in FIGS. 17A–B. The warning device 100 includes three panels 102a–c each of which is formed similarly to the panel 10. The panels 102a–c are each triangular in shape, and have a base 104 and side edges 106. The three panels are connected together, such that one of the side edges of panel 102a is connected to one of the side edges of panel 102b; and one of the side edges of panel 102c is connected to the opposite side edge of panel 102b. Hence, panel 102b is a central panel and the panels 102a and 102c are side panels. The panels are hingedly joined together using clips 107 which are similar to the clip 74 (FIG. 15A) used to connect the two panels together of warning device 70; the clips 107 are simply longer. The free side edge of panel 102c is provided with a connector strip 108 (such as a hook-and-loop fastener), and the free side edge of the panel 102a is provided with a counterpart connector strip 110 (such as a hook-and-loop fastener). Any other conventional type of fastener could also be used. Thus, the device 100 is movable between a position in which the three panels 102a–c lie in parallel planes and a standing position, shown in FIG. 17B, in which the free side edges of the side panels 102a and 102c are connected together to form a triangular pyramid. In this position, the warning device is self-supporting. When the device is in the first position (i.e., the three panels are adjacent each other and in generally parallel planes), the panels can be folded into a compact position, to allow for storage of the warning device in a small area.

Figure 18:
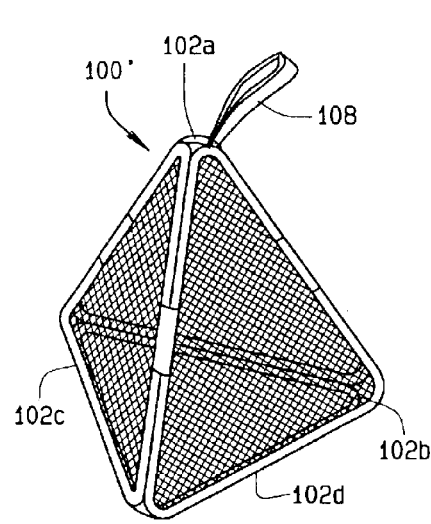
FIG. 18 is a perspective view of a four-panel warning device which forms a triangular pyramid and placed in a position for use.
Figure 19A:
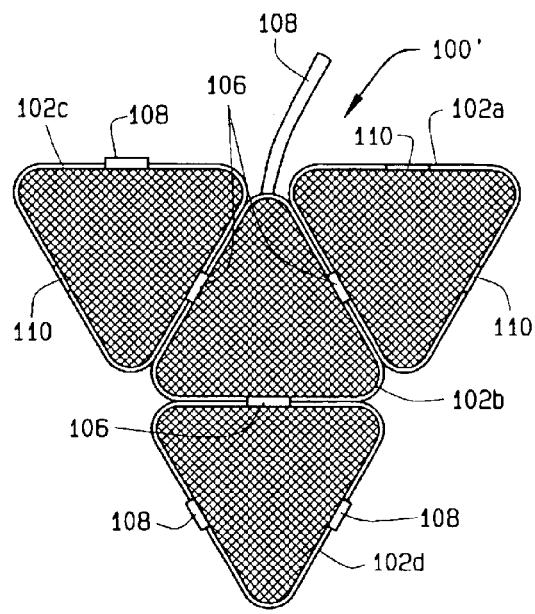
FIGS. 19A–D are views of the four-panel warning device showing folding of the warning device into a compact position in which it can be easily stored.

In FIG. 18, a four-panel warning device 100' is shown. The device 100' is substantially similar to the warning device 100. However, it is provided with a fourth panel 102d (FIG. 19A). As shown in FIG. 19A, the panel 102b becomes a bottom panel and the panel 102d is a side panel the triangular pyramid, as seen in FIG. 18. The panel 102d is hingedly connected to the bottom edge of the one of the three panels 102a–c using a connector 106. The remaining two sides of the panel 102d is provided with one part of a connector. The bottom edges of the remaining two panels are provided with the counterpart to the connector on the panel 102d. For example, the connectors can be Velcro type hook-and-loop fasteners, buttons, snaps, or any other conventional connecting means.

Figure 19B:
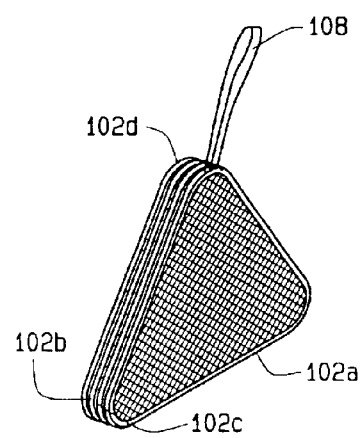
Figure 19C:
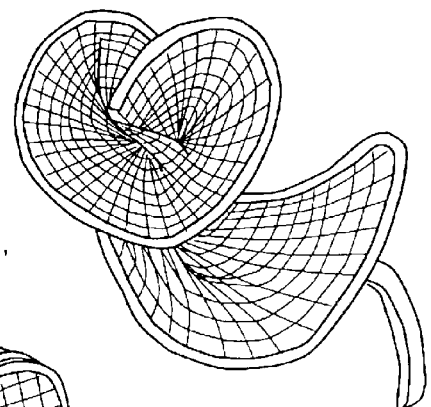
Figure 19D:
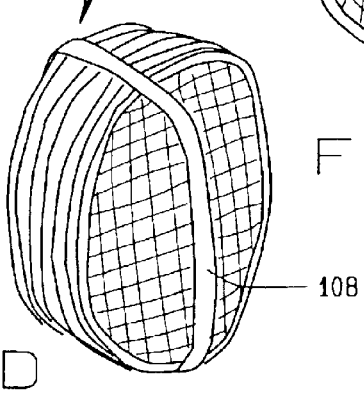

In FIG. 19B, the four panels 102a–d are shown in a position in which they are adjacent each other and lie in substantially parallel planes. The panels can then be folded into a compact form, as shown in FIGS. 19C and 19D. When folded into this compact form, an elastic loop 108 can extend around the panels to hold them in the compact form.

Figure 20A:
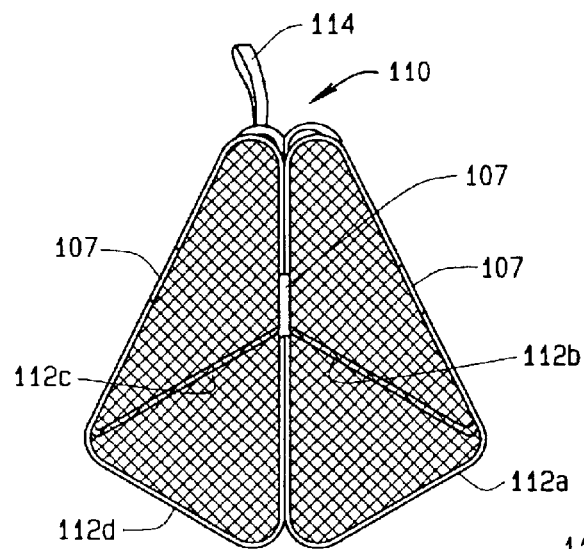
FIGS. 20A–C are views of an four-panel warning device which forms a square pyramid in various states of folding.
Figure 20C:
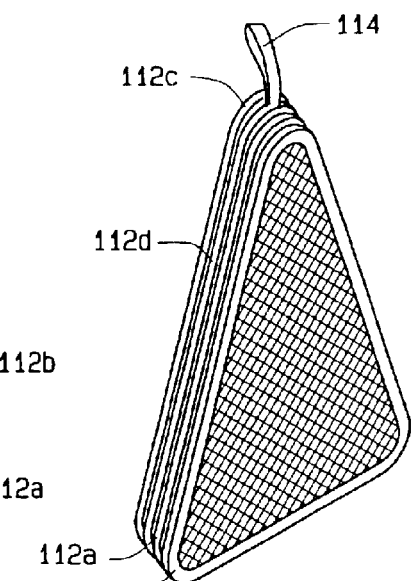
Figure 20B:
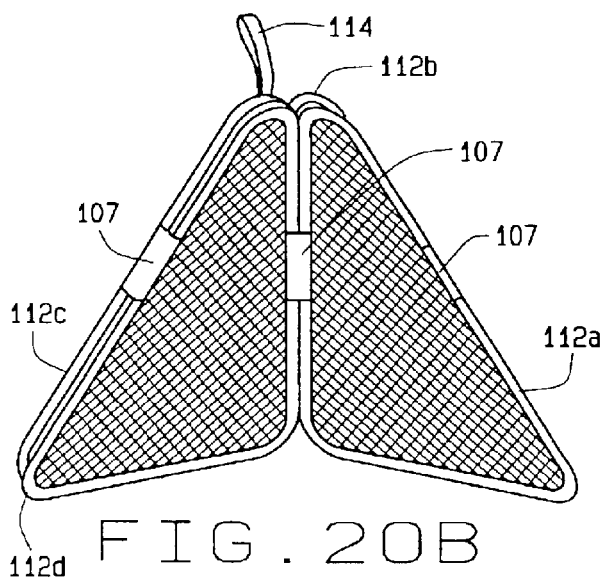

FIG. 20A shows a four panel warning device 110 which forms a four-sided pyramid. The warning device comprises four triangular panels 112a–d which are constructed similarly to the panel 10. The four panels 112a–d are hingedly connected together along their side edges using connectors 107. The four panels can be connected together in a row, similar to the device 100 (FIG. 17B) such that there are two free edges which are connected together, as with the warning devices 100 and 100'. Alternatively, all the edges can be connected together. In this latter instance, the four panels can be folded such that two panels lie in one plane and the other two panels lie in a second plane which is generally parallel to the first plane (as seen in FIG. 20B). The folded device can then be folded again, so that all four panels lie in four generally parallel planes (as seen in FIG. 20C). In this last position, the folded device can be further folded into a compact shape, and then retained in this compact shape using the elastic band 114.

Figure 21A:
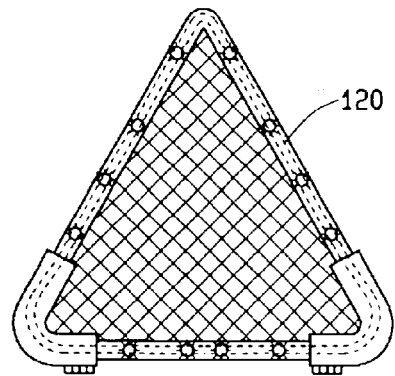
FIG. 21A is a plan view of a panel of the warning device provided with lights.
Figure 21B:
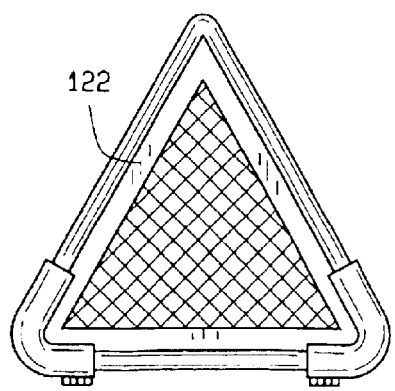
FIG. 21B is a plan view of an alternative triangular warning device, the device be provided with a boarder of reflective or otherwise highly visible material.

FIGS. 21 and 22 show variations to the panels which allow them to be more visible, especially in the dark. FIG. 21A shows a panel in which a lighting element 120 is provided in the periphery of the panel. The lighting element 120 preferably comprises a plurality of spaced apart LEDs. However, the lighting element could also include fiber optics, which carry light from a light source. In either case, the lighting element is preferably battery powered, and can be provided with a switch to activate the lighting element. In FIG. 21B, the panel is provided with a reflective strip 122 which extends around the periphery of the panel.

Figure 22A:
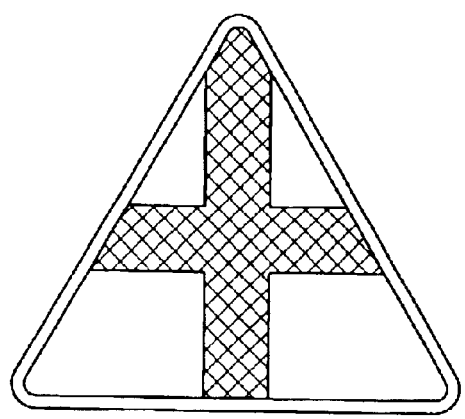
FIGS. 22A–E show a panel of the warning device with different shaped netting or markings.
Figure 22B:
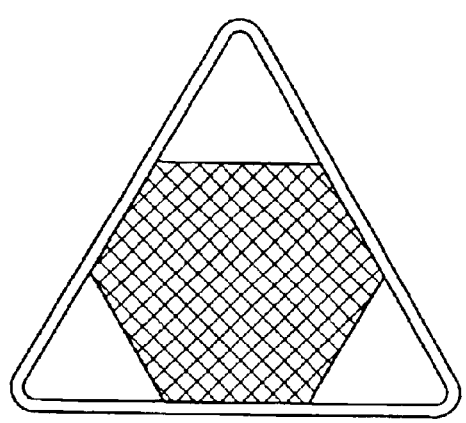
Figure 22C:
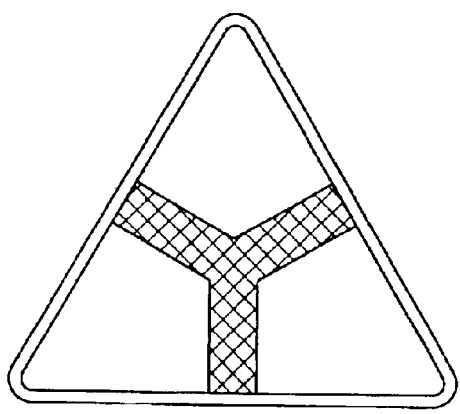
Figure 22D:
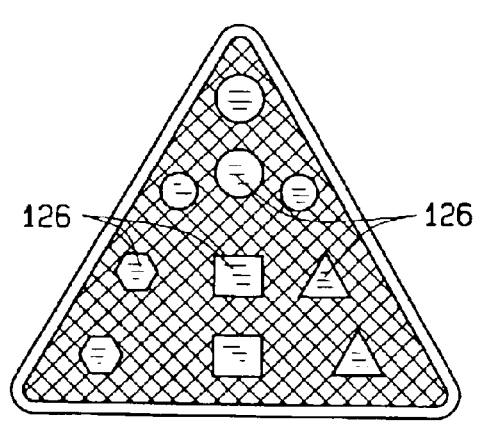
Figure 22E:
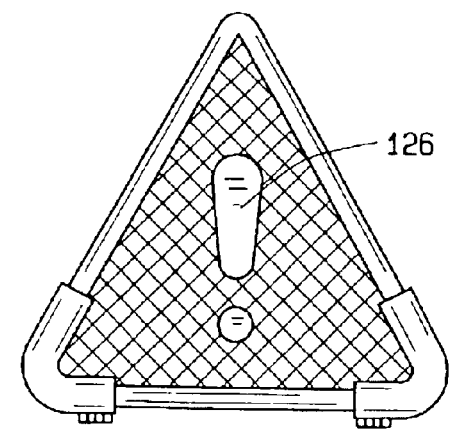

In FIGS. 22A–C, the panel web does not completely fill the area defined by the frame 14. In FIG. 22A, the web forms a cross or "+" shape; in FIG. 22B, the web forms an inverted triangle which is truncated at its corners; and in FIG. 22C, the web forms a "Y" shape. In FIGS. 22D–E, the web is provided with markings 126. In FIG. 22D, the markings include triangles, circles, squares, and hexagons which are applied to the web. These markings can be applied to the web in a desired pattern. Although four different types of markings are shown in FIG. 22D, one or more types of markings can be used, as desired. Other types of markings can be used as well. In FIG. 22E, the marking is shown in the form of an exclamation point (i.e., "!").

Figure 23:
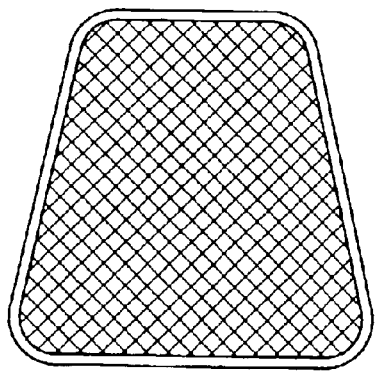
FIG. 23 shows the panel in a trapezoidal "ladder shape" rather than a triangular shape.

Lastly, FIG. 23 shows a panel that is generally trapezoidal in shape. This trapezoidal panel could be used to replace the triangular panel 10.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible warning device comprising:
    at least one panel; said panel comprising a flexible wire frame and a web applied to said frame; said web being applied to said frame by a channel at a periphery of said web and through which said wire frame extends;
    a base; said base being configured to enable said warning device to be mounted to a window of a vehicle or to be free-standing;
    said base comprises a connector having a groove which is sized and shaped to receive at least a part of a peripheral edge of said panel and a pair of legs pivotally mounted to said connector; said legs being pivotal between a first position in which said legs are adjacent and generally parallel to the plane of said panel and a second position in which said legs are generally perpendicular to the plane of said panel.

2. The collapsible warning device of claim 1 wherein said legs of said pair of legs are positioned on opposite sides of said panel.

3. The collapsible warning device of claim 1 wherein said legs define a channel, said leg channel being sized and shaped to at least partially enclose said panel periphery when said legs are in their first position.

4. The collapsible warning device of claim 1 wherein said panel includes at least one light emitting device.

5. The collapsible warning device of claim 4 wherein said light emitting device comprises a plurality of LED's spaced around a periphery of said panel.

6. A collapsible warning device comprising:
at least one panel; said panel comprising a flexible wire frame and a web applied to said frame; said web being applied to said frame by a channel at a periphery of said web and through which said wire frame extends;
a base; said base being configured to enable said warning device to be mounted to a window of a vehicle or to be free-standing;
said base comprises a connector having a channel which is sized and shaped to receive at least a part of a peripheral edge of said panel and at least one leg pivotally mounted to said connector; said leg including a hook sized and adapted to be received on an edge of a vehicle window.

7. A collapsible warning device comprising:
at least one panel; said panel comprising a flexible wire frame and a web applied to said frame; said web being applied to said frame by a channel at a periphery of said web and through which said wire frame extends;
a base; said base being configured to enable said warning device to be mounted to a window of a vehicle or to be free-standing;
said base comprises a channel member having a first portion which receives at least a part of a bottom edge of said panel and a second portion which receives at least a part of a side edge of said panel; said base further including a leg pivotally mounted to said channel member to be movable between a first position in which said leg is generally perpendicular to the plane of said panel and a second position in which said leg is generally parallel to the plane of said panel.

8. The collapsible warning device of claim 7 wherein said base includes a sleeve extending along at least a portion of said base first portion; said sleeve receiving said leg.

9. A collapsible warning device comprising:
at least one panel; said panel comprising a flexible wire frame and a web applied to said frame; said web being applied to said frame by a channel at a periphery of said web and through which said wire frame extends; and
a base; said base being configured to enable said warning device to be mounted to a window of a vehicle or to be free-standing; said base comprising a connector having a groove which is sized and shaped to receive at least a part of a peripheral edge of said panel and a pair of legs pivotally mounted to said connector; said legs being pivotal between a first position in which said legs are adjacent and generally parallel to the plane of said panel and a second position in which said legs are generally perpendicular to the plane of said panel;
said base includes a hook on at least one of said legs, said hook being sized, shaped, and adapted to be received on an edge of a vehicle window.

\* \* \* \* \*